Sept. 11, 1923.  G. PFLEGER  1,467,450
FAUCET
Filed April 14, 1922  2 Sheets-Sheet 1
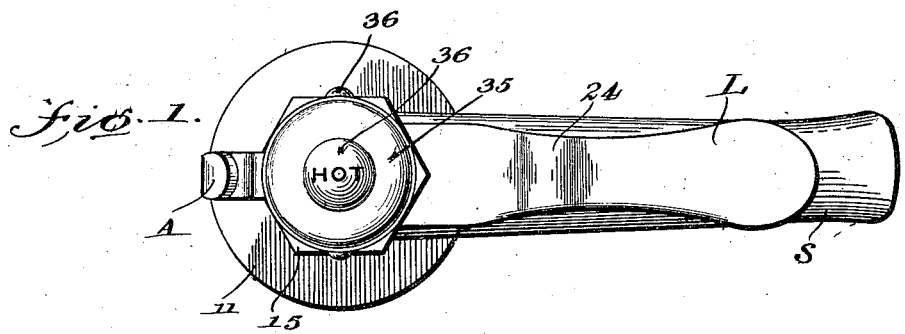
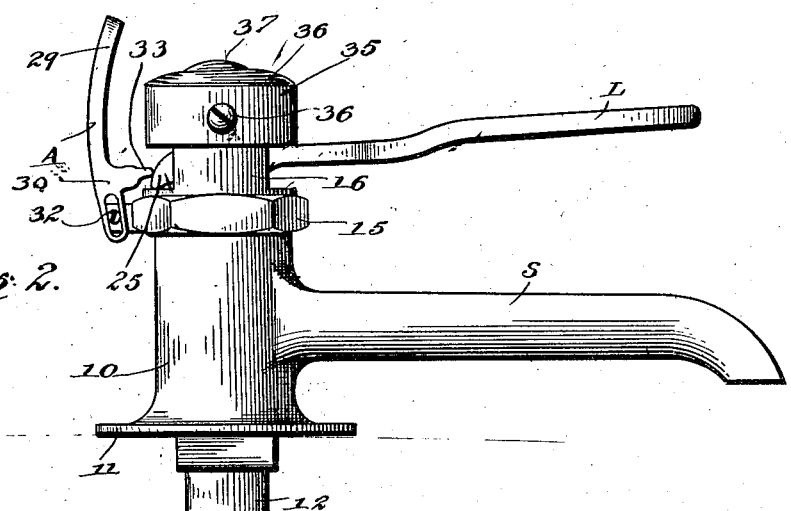
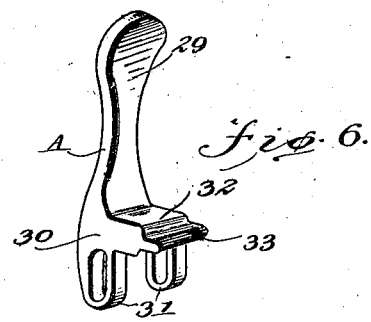
INVENTOR
Gustav Pfleger,
BY
ATTORNEYS Sept. 11, 1923.
G. PFLEGER
FAUCET
Filed April 14, 1922  2 Sheets-Sheet 2
1,467,450
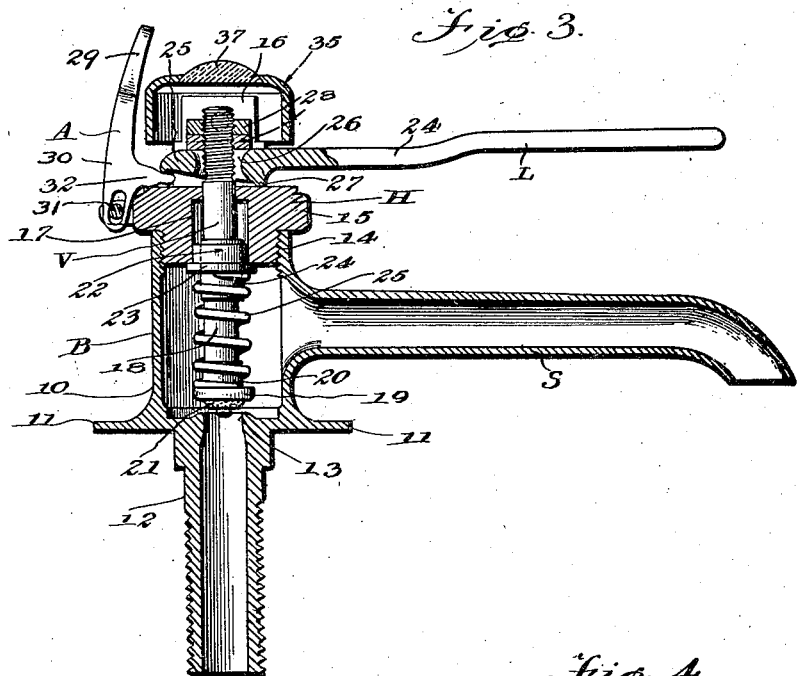
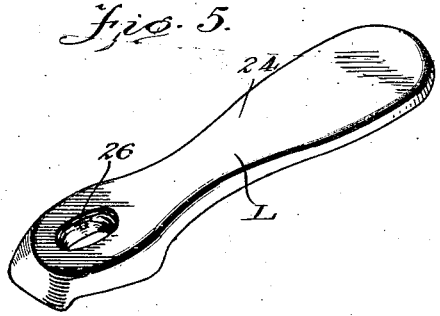
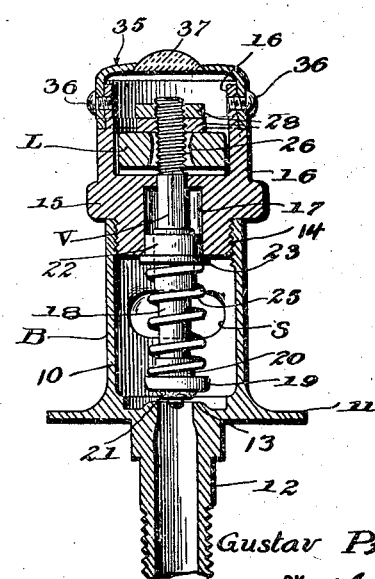
WITNESSES
INVENTOR
Gustav Pfleger,
BY
ATTORNEYS Patented Sept. 11, 1923.

1,467,450

UNITED STATES PATENT OFFICE.

GUSTAV PFLEGER, OF BRIDGETON, NEW JERSEY.

FAUCET.

Application filed April 14, 1922. Serial No. 552,536.

*To all whom it may concern:*

Be it known that I, GUSTAV PFLEGER, a citizen of the United States, and a resident of Bridgeton, in the county of Cumberland and State of New Jersey, have invented certain new and useful Improvements in Faucets, of which the following is a specification.

This invention relates to improvements in faucets.

The object of the invention is to provide a faucet which is adapted to eliminate any possibility of waste of water or other liquid due to the lack of tight closing of a faucet.

Other objects will hereinafter appear.

In carrying out the invention it is contemplated to provide a faucet having a spring pressed valve adapted to be normally closed and to associate with the valve a suitable lever for lifting the same, and means whereby the valve may be locked in its raised position.

The invention is illustrated by way of example in the accompanying drawings, in which :—

Figure 1 is a top plan view of a faucet constructed in accordance with the present invention.

Figure 2 is a view in side elevation of the same.

Figure 3 is a vertical sectional view of the same.

Figure 4 is a view similar to Figure 3, but taken at right angles thereto.

Figures 5 and 6 are perspective views of the lever handle and for latch or lock, respectively.

Referring to the drawings more particularly, B indicates generally the body of the faucet, S the spout thereof, H the head for the faucet, L the lever handle for raising the valve V, and A the latch for locking the valve in its raised position.

The body B of the faucet more particularly consists in the hollow portion 10 which is formed at its lower end with a flange 11 and also with a nipple extension 12 which may be threaded if desired as shown; said nipple extension having its inner end terminating in a slight protrusion 13 adapted to form a seat valve seat. The spout S is of the usual construction, and the head H consists in a plug structure comprising the enlarged nut head portion 15 and threaded portion 14, which is adapted to be threaded into the upper end of the body portion 10 of the faucet. The top of the nut-head 15 is formed with the two extensions 16 which are arcuate in shape and concentric to the head. The head H is also formed with a bore 17 which is restricted at its upper end to permit only the passage of the stem 18 of valve V. The stem 18 has formed upon its lower end an enlargement or collar 19 and above this collar there occurs an enlargement 20. The collar or enlargement 19 may be termed a "head", and said head carries a rubber plate or washer properly bevelled as at 21 which is adapted to seat for closing the inlet to the passage of the nipple 12.

The stem 18 has fitted thereon for sliding movement a sleeve 22 which has formed therewith a collar 23, and below the collar there is extended a reduced sleeve portion 24. The sleeve 22 is adapted to slidingly extend within the bore 17, while the collar 23 is adapted to limit the upward movement of said sleeve. Between the collar 23 and the head or collar 19 there is interposed a coil spring 25, said spring having its ends encircling the reduced sleeve portion 24 and also the enlargement 20 at the lower end of the stem. The spring 25 is adapted to press the valve for seating to close the inlet or passage through the nipple 12.

The upper end of the stem 18 projects above the head H and is threaded as shown. The lever L consists in a handle portion 24 which terminates in a head 25, said head having an enlarged opening 26 and also formed with a foot at its inner side as at 27. A pair of lock nuts 28 are threaded upon the threaded portion of the stem to hold the lever thereon, and the foot 27 of the lever serves as a fulcrum whereby upon downward pressure upon the handle portion 24 of the lever, the stem 18 may be raised against the tension of the spring 25 to raise the valve to its open position.

The latch A consists in a handle portion 29 which is formed with a head 30, said head in turn having formed therewith two slotted extensions 31 and a projection 32 which is reduced at its outer end as at 33. The head H is provided with suitable projections adapted to support a pin or screw 33 which extends through the slots of the slotted extensions 31 of the latch A as best shown in Figure 3, and permits free upward and downward movement of the latch member. With the latch member mounted in this manner the projection 32 is adapted to be brought so that its reduced portion 33 may extend beneath the associated end of the lever bar L and hold the same in its position for raising the valve V as illustrated in Figure 3. To the extensions 16 of the head H there may be secured a cap 35 by means of set screws or the like as at 36, and this cap may have an opening in the top thereof which is closed by glass or the like as at 37, and upon this glass may be written "Hot" or "Cold" to indicate the water with which the faucet is connected as illustrated in Figure 1.

In the use of the present faucet, the same is connected through its nipple to a source of liquid supply and with the latch A disengaged from the associated end of the lever bar L, as illustrated in Figure 2 the valve member V is seated for closing the faucet. When it is desired to draw liquid through the faucet, the handle portion 24 of the lever L is pressed downward and which, in an obvious manner, will raise the valve V; and if desired the latch A may now be employed for holding the valve V raised. Upon releasing the lever L by the latch A the valve V is at all times pressed by the spring 25 to its closed position and thus insures that no waste of liquid will be had due to the fact that a valve is not tightly closed.

I claim:—

1. A faucet comprising a hollow body member formed with a nipple extension at its lower end and a spout upon the side thereof, a head threaded into the upper end of the body member, a stem slidable through said head carrying a valve head upon its lower end adapted to form a closure for the passage of the nipple when seated thereover, a sleeve slidable upon the stem and adapted to extend within an enlargement bore in the head, a collar formed upon said sleeve adapted to limit the upward movement thereover into said enlarged bore, a coil spring interposed between the collar of said sleeve and valve head adapted to press the stem so that its valve head will seat for closing the passage of the nipple, a lever handle having its one end loosely connected to the upper end of the stem and said end of the lever being formed with a foot or protrusion adapted to engage the head of faucet to serve as a fulcrum whereby upon pressure on the free end of said lever the stem may be raised for opening the passage of the faucet nipple, a latch pivoted to the head for upward and downward swinging movement, a tooth or projection formed upon the latch and adapted to be brought to engage beneath the pivoted end of the lever bar whereby to hold the same in position for raising said stem.

2. In combination, a valve casing, a spring pressed valve stem within said casing, a lever having an opening in one end adapted to receive said stem and said lever being adapted to rest upon the casing, means to hold the lever against disengagement with said stem, and said lever being adapted to be engaged for lifting said valve when tilted in one direction, a latch member pivoted to the casing and having a finger extending laterally therefrom adapted to be brought beneath the associated end of the lever and hold the same in its tilted position.

3. In combination, a valve casing, a spring pressed stem protruding from the upper end of said casing, a lever having a head with an opening adapted to receive said stem, means to hold the lever against removal from said stem, a protrusion upon said head of the lever adapted to serve as a fulcrum for the lever in lifting said stem, and a latch member pivotally supported by the casing and having a finger extension adapted to be inserted beneath the head of said lever for holding the same when in position for lifting said valve stem.

GUSTAV PFLEGER.